United States Patent [19]

Pipko et al.

[11] Patent Number: 4,936,897
[45] Date of Patent: Jun. 26, 1990

[54] METHOD FOR THE MANUFACTURE OF SLOW RELEASE FERTILIZERS

[75] Inventors: Grigori Pipko, Haifa; Shalom Manor, Kiryat Haim; Moshe Ziv, Kiryat Motzkin, all of Israel

[73] Assignee: Haifa Chemicals Ltd., Haifa, Israel

[21] Appl. No.: 134,227

[22] Filed: Dec. 17, 1987

[30] Foreign Application Priority Data

Jan. 20, 1987 [IL]  Israel ..................................... 81311

[51] Int. Cl.$^5$ .......................................... A01N 25/26
[52] U.S. Cl. .................................. 71/64.05; 71/64.07; 71/64.11; 71/64.13; 264/117; 427/212
[58] Field of Search ............ 264/117; 71/64.02, 64.03, 71/64.05, 64.07, 64.11, 64.13; 427/213, 214, 215, 217, 220, 221, 242, 212

[56] References Cited

U.S. PATENT DOCUMENTS

| | | | |
|---|---|---|---|
| 3,096,171 | 7/1963 | Woerther | 71/64.07 |
| 3,158,462 | 11/1964 | Wilson | 71/4 |
| 3,223,518 | 12/1965 | Hansen | 71/64.07 |
| 3,232,740 | 2/1966 | Sor et al. | 71/64.11 |
| 3,242,237 | 3/1966 | Belak et al. | 264/13 |
| 3,259,482 | 7/1966 | Hansen | 71/64.11 |
| 3,306,730 | 2/1967 | Malmberg | 71/64.07 |
| 3,321,298 | 5/1967 | Bidlak et al. | 71/64.07 |
| 3,697,245 | 10/1972 | Dilday | 71/64.11 |

FOREIGN PATENT DOCUMENTS

| | | | |
|---|---|---|---|
| 55-25456 | 2/1980 | Japan | 71/64.11 |
| 56-164089 | 12/1981 | Japan | 71/64.02 |
| 58-213694 | 12/1983 | Japan | 71/64.11 |
| 996633 | 6/1965 | United Kingdom | 71/64.2 |
| 2127004 | 4/1984 | United Kingdom | 71/64.11 |

*Primary Examiner*—Jan H. Silbaugh
*Assistant Examiner*—Mary Lynn Fertig
*Attorney, Agent, or Firm*—Morgan & Finnegan

[57] ABSTRACT

A method for the manufacture of physically prepared slow-release fertilizer by coating fertilizer particles with at least one layer of a substantially water insoluble metal salt formed in-situ from an organic acid having between 6 and 30 carbon atoms and a metal oxide or carbonate. Optionally, the coating layer contains micronutrients and inert materials. In a preferred embodiment, an additional layer of paraffin is added on the coating of metal salt of organic acid. The method is applicable for most of the known fertilizers. The method enables to vary the rate of fertilizer release and the release period time according to specific requirements.

17 Claims, No Drawings

METHOD FOR THE MANUFACTURE OF SLOW RELEASE FERTILIZERS

The present invention relates to an improved method for the manufacture of slow-release fertilizers. More particularly, the invention relates to an improved method for the manufacture of physically prepared slow-release fertilizers possessing the property of releasing the fertilizers after long periods of time.

BACKGROUND OF THE INVENTION

It is a well-known fact that no fertilizer, of whatever composition, is ever utilized by the crop with a complete efficiency. This occurs particularly with nitrogen-based fertilizers, although it is encountered also with all water-soluble fertilizers. The main reason for this deficiency is the rapid dissolution of the fertilizer in the soil, where only a part thereof is actually utilized, the balance being lost in the draining of rain or irrigation water. Two main solutions were suggested to overcome this disadvantage:

(a) use of chemically prepared slow-release fertilizers, such as ureaform, isobutylidene diurea, oxamide etc., and
(b) use of physically prepared slow-release fertilizers, by coating the fertilizer granules with sulfur, wax or synthetic polymers, which decreases the removal of the fertilizer from the soil by rain or irrigation water.

The disadvantage of the chemically prepared slow-release fertilizers is mainly connected with their costs, since quite expensive raw materials and/or manufacturing costs are involved. Thus for instance, in case of nitrogen-based fertilizer, it was stated that using nitrogen compounds of reduced solubility is at least twice as costly as using standard soluble nitrogen fertilizers.

Whereas the present invention deals with physically prepared slow-release fertilizers, more discussion and relevant prior art references will be presented on this approach.

PRIOR ART REFERENCES

The literature is quite abundant with many references, patents and reviews, describing the method of producing physically prepared slow-release fertilizers. The general idea is to provide an insoluble coating on granules of water-soluble fertilizers. A variety of materials has been found suitable for coating purposes, the most important of these being wax, sulfur and organic polymers of different types. Among the polymers the following are mentioned: copolymers of dicyclopentadiene and glyceryl ester of an unsaturated organic acid (U.S. Pat. No. 3,223,518) epoxy-polyester resin (U.S. Pat. No. 3,259,482) urethane coating (U.S. Pat. No. 3,264,089) polystyrene coating (U.S. Pat. No. 3 158 462). The main disadvantage of the organic polymers is their relatively high costs which render them not to be economically feasible to use for a cheap product such as fertilizer. The mechanism by which the polymer acts is as follows: the polymer coats the particles of fertilizer with a skin or glove which skin persists on the granules until substantially all the water soluble material has been leached out.

The use of sulfur coating is encountered mainly with urea, where it has been shown to have significant advantages over conventional fertilizers on certain crops. A typical discussion describing in a detailed manner this method is given in two papers by Lynch T.B.(1) and by Meisen and Mathur (2) presented at the British Sulphur Corporation (Second International Conference on Fertilizers, London, 4–6 December, 1978). The main disadvantage of sulfur is the fact that it was found not to be adequately resistant to moisture penetration. Accordingly, addition of an oily-wax sealant over the sulfur coating is required. Also, sulfur can not be utilized in fertilizers containing nitrate where explosive compositions might result.

The use of wax is the most popular coating for various water-soluble fertilizers. An improved method is described in the U.S. Pat. No. 3,242,237. The method involves the formation of a fluid dispersion of the water-soluble fertilizer in molten wax and then dropping such dispersion in the form of droplets into water. As each droplet of the fluid dispersion contacts the water, it immediately solidifies and becomes a solid particle comprising a dispersion of solid fertilizer in solid wax. One disadvantage of using wax-coated fertilizer is that the wax content of the coated fertilizer must often be quite high in order to provide a satisfactory reduction in the rate at which the fertilizer is released to the plant. In areas of relatively heavy rainfall, wax contents in the order of 50% may be necessary. Such quantities of wax make the use of fertilizer quite expensive.

The use of plant-derived wax such as palm, carnauba or sugar cane as the coating material, instead of paraffin, is described in the U.S. Pat. No. 3,096,171. It is claimed that in certain respects these compounds are superior to paraffin wax for coating purposes.

Finally, tung oil (called also wood oil) is suggested as a coating to provide an effective slow-release fertilizer (U.S. Pat. No. 3,321,298). The advantage claimed for this oil is the fact that it does not necessitate the use of flammable solvents. As known, tung oil is a drying oil obtained from the seed of the tung tree and consists of glycerides that polymerize to a hard gel on heating. For optimum results, it is suggested to incorporate small amounts of driers prior to its application. Examples of such driers are lead, manganese and cobalt salts, as generally used in the art of paint and varnish manufacture.

The above brief review clearly indicates the great interest attributed in the last forty years to the object of providing slow-release fertilizers. This interest becomes more accentuated in these days, when the costs of the fertilizers and their application to the soil increase significantly.

SUMMARY OF THE INVENTION

It is an object of the present invention to provide a method for the manufacture of physically prepared slow-release fertilizers. It is another object of the present invention to provide a simple method for the manufacture of slow-release fertilizers, the release of the fertilizers occuring after prolonged period of time. It is yet another object of the present invention to provide a simple method for the manufacture of slow-release fertilizers, wherein the release of the fertilizer can be "tailor made" according to the specific purpose. Thus, the invention consists of a method for the manufacture of physically prepared slow-release fertilizers, wherein the fertilizer particles are coated by at least one layer of a substantially water-insoluble metal salt of an organic acid containing between 6 and 30 carbon atoms, the metal salt coating being formed in-situ, from the organic acid and a metal oxide or carbonate. It was unexpectedly found that when said coating was obtained in-situ, the fertilizer will persist for prolonged periods of time which are longer than those encountered by the slow-release fertilizers obtained by the known methods. Moreover, as will appear from the comparative example 8 presented in the experimental part, when the coating of the fertilizer particles was done by a metal salt previously prepared, using the same organic acid and metal cation, at the same coating thickness, the fertilizer will persist for shorter periods of time than that according to the present invention. The term of metal oxide does include also a metal hydroxide which does react in-situ with the organic acid to produce the corresponding metal salt.

DESCRIPTION OF THE PREFERRED EMBODIMENTS

According to a preferred embodiment, the coating consists of two or three layers of an insoluble metal salt of an organic acid (containing between 6 and 30 carbon atoms) formed in-situ. It is further preferably that an additional coating of wax or paraffin over the metal salt will also be added, its purpose being as a sealant. Of course, the amount of the sealant compound should be only a small part of the coating composition, generally being in a range of between 3-15% by weight thereof. The main object of the wax or paraffin coating is only to obtain a thin film which should cover the pores of the coating to avoid entrance of water to the fertilizer and providing a smooth surface to the resulted slow-release granules.

The method according to the present invention can be easily incorporated in any existing fertilizer plant, the equipment required being mainly a granulator device of any type such as pan granulator, revolving drum, fluidized bed etc. The fertilizer particles, preferably in a granular form, will be admixed with a metal oxide (carbonate or hydroxide) and subsequently by spraying a stream of an organic acid (having between 6 and 30 carbon atoms), generally under a slight heating, coated granules by the respective metal salt will result. It is also possible that together with the metal oxide, other inert materials such as talc, limestone, dolomite or clays, or micronutrients, could be incorporated. The thickness of the coating may be varied according to the specific requirement, by varying the respective amounts of the organic acid and metal oxide present in the system.

In addition to the improved slow-release property of the products obtained according to the present invention, it was found that they possess excellent storage and handling characteristics and might even be handled in bulk under humid climate.

The rate of nutrient release and release period time can be varied by the selection of the coating constituents, coating thickness and of course the particular fertilizer. Accordingly, a great flexibility in formulations can be achieved. The release of nutrients from the coated particles is initiated by movement of water vapor through the coating which will dissolve soluble core and subsequently the nutrients in solution will diffuse outward through the coating into the soil.

The inventors are not yet in a position to present a theoretical explanation why the coating of metal salt of the organic acid formed in-situ, will retain the fertilizer for longer period of time than the case when the coating is obtained by the direct application of the corresponding metal salt prepared separately. It seems that in case of in-situ formation of the metal salt coating, some polymerising effect occurs through the unsaturated bonds of the organic acid. The organic acid can be selected from the aliphatic or aromatic acids possessing between 6 and 30 carbon atoms and preferably between 12 and 20 carbon atoms. Of course, it is not necessary to use a pure acid, and any mixture of technical organic acids (containing the above range of carbon atoms) can be useful. In this case, also the costs of the acid will be much lower than those of the pure acids. It is also possible to utilize crude mixed vegetable and animal acid oils containing the above organic acids such as tall oil, tung oil etc. As known, tall oil is a resinous admixture of resin fatty acids, high molecular-weight alcohols and other materials, derived from wood-pulping waste liquors; it is found in abundant quantities in several places its costs being quite low.

As already mentioned, the coating of the fertilizer is carried out in a granulator. Generally the coating is carried out under heating at a temperature in the range of between 35 and 200 degrees C. The heating assists the formation of a more homogeneous coating. The exact temperature will be selected according to the system involved as well as the particular fertilizer to be coated. The most preferred temperature range will be between 50 and 100 degrees C.

The metal oxide to be used may be in its impure form or even a natural material such as limestone, dolomite or iron oxide which will form with the organic acid a corresponding calcium salt or mixed calcium-magnesium salt.

There are many organic acids, possessing between 6 and 30 carbon atoms, to be utilized in the method according to the present invention, most of them being available in bulk. Typical examples of such acids are: oleic acid, lauric acid, palmitic acid, stearic acid, caprilic acid, miristic acid, EMERY 140 (Trade Mark, produced by Procter & Gamble Ltd.) which is a mixture of stearic and palmitic acids), DIACID 1550 (Trade Mark, produced by Westvaco, being a mixture of dimeric acids containing 15 carbon atoms etc. The last two organic acids are commercially available in bulk being also less expensive than the pure organic acids. As will be realized, the melting points of the organic acids will vary, generally increasing with an increase in the number of carbon atoms. A person skilled in the art, after reading the present specification, will be in a position to select the proper acid according to the specific use, cost and availability at site.

The slow-release fertilizers obtained according to the present invention possess many advantageous characteristics. First, it will reduce the damage to plants, by a rigorous control of the fertilizer present in the metal salt coating, due to the avoidance of high local concentrations of the soluble fertilizer materials. By a proper selection of the coating component, the number of layers as well as the thickness of each layer, it will be possible to regulate the exact release of the fertilizer. Moreover, it will be possible to release the exact amount according to the growth of the plant. Thus for instance a slow release of nitrogen will be desirable when the plant is young and small, and a fast-release when it is growing rapidly. Also, the very large number of substantially insoluble metal salts of the above organic acids, enable the versatility of the method so that a "tailor-made" slow-release fertilizer could be produced.

Another advantage of the method according to the present invention, is the possibility to obtain the granules of the coated fertilizer at the desired size. It is possible to start with small particles of a desired fertilizer, the granulation and coating being carried out subsequently at the same pan granulator. It is possible to form first small granules and thereafter to form larger pellets, according to the specific use. As commonly used in the art of granulation, known binders will be required to be incorporated. Preferably, the binder materials should be water repellent. Typical examples of such materials are heavy hydrocarbon residues, asphalts, waxes etc. These materials may be heated to liquefy, or they may be dissolved in a low boiling solvent, so that during the heating of the pan granulator, the solvent evaporates out leaving the binder on the granules.

As mentioned above, it is also possible to incorporate during the granulation various inert materials such as limestone, phosphate rock, gypsum, clays, talc or desired micronutrients, etc, the amount thereof being variable, generally being in the range of between 5 and 50% by weight of the composition. The inert material will also influence to some extent, the rate of the fertilizer release from the granules.

The particle size of the coated fertilizer granules may vary appreciable, but are preferably below about 5 cm diameter. Most preferably the particle size of the pellets will be in the range of between 1 to 5 mm diameter. It should be pointed out that the pellets may be also in the form of any other geometric configuration (pills, cylinder etc) and not only beads or granules, although the latter is preferred.

The fertilizer to be coated according to the present invention, may be selected from the well-known water-soluble fertilizers such as: urea, potassium nitrate, potassium sulfate, ammonium nitrate, monopotassium phosphate, ammonium phosphates, mixtures of N:P:K. fertilizers, etc. Whereas the coating constituents are quite inert material, the existent problem encountered with sulfur, where possible explosive compositions might be obtained, is completely eliminated.

The invention will be hereafter illustrated by a number of Examples, being clearly understood that no limitation should be understood, since many variations could be conceived, without being outside the scope of the present invention. Example 8 presented below, is not part of the invention and is given only for comparative purposes in order to compare the dissolution time when the coating of the fertilizer was produced by a metal salt of organic acid, prepared prior to the coating (i.e. not in-situ as claimed according to the present invention).

The concentrations given in the Examples are by weight, unless otherwise stated.

EXAMPLE 1

An amount of 150 g of potassium nitrate (prills) was introduced in a laboratory rotating pan and heated at about 75 degrees C. To the prills of potassium nitrate an amount of 8 grams of stearic acid was added together with an amount of 2 grams of calcium hydroxide. After the entire amount of oil was consumed, by its reaction with the calcium hydroxide, free flowing granules were obtained consisting of coated potassium nitrate by calcium stearate, formed in-situ from the two reagents.

To the coated granules in the pan granulator, an amount of 6 g of paraffin was added together with a small quantity (about 2 g) of calcium hydroxide (as inert constituent) and the pan granulator continued to operate until all the paraffin was consumed. After cooling, the granules were taken out from the granulator, the composition of the coating being as follows:
- 31 g of calcium hydroxide,
- 8 g of stearic acid, and
- 6 g of paraffin.

The granules of coated fertilizer were tested for their dissolution in water and it was found that their substantially complete dissolution occured after 432 hours.

EXAMPLE 2

The experiment as described in Example 1 was repeated using a commercial fatty acid (mixture of stearic and palmitic acids) sold under the Trade Mark EMERY 140 by Procter & Gamble Ltd. The composition of the coating was as follows:
- 8 g of EMERY 140.
- 6 g of paraffin, and
- 47 g of calcium hydroxide.

The substantially complete dissolution in water of the coated granules produced was 312 hours.

EXAMPLE 3

The experiment as described in Example 1 was repeated using as the organic acid a dimeric acid containing 15 carbon atoms (Diacid 1550 Trade Mark, produced by Westvaco). The composition of the coating was as follows:
- 8 g of the Diacid 1550,
- 6 g of paraffin, and
- 32.2 g of calcium hydroxide.

The substantially complete dissolution in water of the coated granules was about 600 hours.

EXAMPLE 4

The experiment as described in Example 1 was repeated, but in this case the calcium hydroxide used as the inert material in the step of the coating with paraffin, was replaced by 15.1 g of talc. Also, the stearic acid was replaced by 10 g of a mixture of fatty acids (EDENOR UKD 3510, Trade Mark produced by Henkel, West-Germany).

The composition of the coating was as follows:
- 10 g of EDENOR UKD 3510,
- 22.9 g of calcium hydroxide,
- 6 g of paraffin, and
- 15.1 g of talc.

The granules of coated fertilizer were tested for their dissolution in water and found that their substantially complete dissolution occurred after 984 hours.

EXAMPLE 5

The same equipment as in the previous Examples was utilized, but in this case the coating consisted of 3 layers. In the first layer, the coating contained 3.4 g of stearic acid, about 8.8 g of calcium hydroxide, 2 g of paraffin and 6.8 g of talc. The granules obtained were treated again in a similar manner, with two separate additional portions, of the above four reagents, one after the other resulting the granules coated by three layers. The overall composition of the three layers was as follows:
- 10 g of stearic acid,
- 26.29 g of calcium hydroxide,
- 6 g of paraffin, and
- 20.4 g of talc.

The resulted coated granules dissolve in water substantially complete after about 1200 hours.

EXAMPLE 6

The experiment as described in Example 1 was repeated, using 50 g of urea (instead of potassium nitrate), the pan granulator being heated at about 50 degrees C. The coating consisted of calcium salt of tall oil formed in-situ and had the following composition 6 g of tall oil, 9.9 g of calcium hydroxide, and 3 g of paraffin. The substantially complete dissolution in water of the resulted granules of coated urea was about 1200 hours.

EXAMPLE 7

A water-soluble fertilizer composition containing N:P:K (15:15:15) was prepared and introduced in the pan granulator heated at about 60 degrees C., as described in Example 1. The coating composition was as follows:
10 g of tall oil,
15.7 g of calcium hydroxide,
6 g of paraffin, and
15.7 g of talc.
The substantially complete dissolution of the coated granules occured after 340 hours.

EXAMPLE 8

A comparative experiment as described in Example 1 was performed, with the same pan laboratory granulator as in the previous Examples, the fertilizer being also 150 g of potassium nitrate (prills), but the reagent used for the coating was calcium stearate i.e. the already formed salt. Into the granulator containing the resulted coating an amount of 6 g paraffin was added together with 2 g of calcium hydroxide (as inert constituent). The analysis of the coating was as follows:
31 g of calcium hydroxide,
8 g of stearic acid, and
9 g of paraffin.
The granules obtained possess indeed a smooth surface, due to the paraffin coating, but their strength was quite poor. Their dissolution in water was only 48 hours (compared with 432 hours in Example 1).

What is claimed is:

1. A method for the manufacture of physically prepared slow-release fertilizers, wherein the fertilizer particles are coated by at least one layer of a substantially water insoluble metal salt of an organic acid containing between 6 and 30 carbon atoms, the metal salt coating being formed in-situ by the chemical reaction between the organic acid and metal oxide or carbonate.

2. A method according to claim 1, wherein the organic acid is a mixture of two or more organic acids.

3. A method according to claim 1, wherein the organic acid contains between 12 and 20 carbon atoms.

4. A method according to claim 1, wherein an additional layer of paraffin is added as a coating on the metal salt of the organic acid.

5. A method according to claim 1, wherein the metal is selected from the group consisting of calcium, magnesium, iron and aluminum and any mixture thereof.

6. A method according to claim 2, wherein the organic acid used is tall oil.

7. A method according to claim 1, wherein at least one inert material and micronutrients are incorporated during the coating.

8. A method according to claim 7, wherein said inert material is selected from limestone, dolomite, talc and clays.

9. A method according to claim 7, wherein the amount of inert material is between 5% and 50% by weight of the composition.

10. A method according to claim 1, wherein the fertilizer particles to be coated are in a granular form.

11. A method according to claim 10, wherein during the preparation of the coated fertilizers in a granular form, a binder is incorporated therein.

12. A method according to claim 11, wherein said binder is water repellent.

13. A method according to claim 12, wherein said binder is selected from wax, heavy hydrocarbon residues and asphalts.

14. A method according to claim 1, wherein the fertilizer is selected from potassium nitrate, urea, monopotassium phosphate, ammonium sulfate, potassium sulfate, ammonium phosphate and N:P:K fertilizers.

15. A method according to claim 1, wherein the coating is carried out on small particles of fertilizer, producing the coated granules thereof.

16. A method according to claim 1, carried out at a temperature in the range of 35° C. to 200° C.

17. A method according to claim 1, carried out at a temperature in the range of 50° C. to 100° C.

* * * * *